United States Patent
Choi et al.

(10) Patent No.: US 8,870,223 B2
(45) Date of Patent: Oct. 28, 2014

(54) AIRBAG APPARATUS FOR VEHICLE

(71) Applicants: Hyundai Motor Company, Seoul (KR); Kia Motors Corporation, Seoul (KR); Autoliv Development AB, Vargarda (SE)

(72) Inventors: Jun Yeol Choi, Seoul (KR); Sung Woo Lee, Gyeonggi-do (KR); Dong Young Kim, Gyeonggi-do (KR)

(73) Assignees: Hyundai Motor Company, Seoul (KR); Kia Motors Corporation, Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/856,632

(22) Filed: Apr. 4, 2013

(65) Prior Publication Data
US 2014/0175778 A1 Jun. 26, 2014

(30) Foreign Application Priority Data
Dec. 26, 2012 (KR) ........................ 10-2012-0152949

(51) Int. Cl.
*B60R 21/239* (2006.01)
*B60R 21/2338* (2011.01)

(52) U.S. Cl.
CPC ........... *B60R 21/2338* (2013.01); *B60R 21/239* (2013.01)
USPC ...................................... 280/743.2; 280/739

(58) Field of Classification Search
CPC ............ B60R 21/2338; B60R 21/2342; B60R 21/239; B60R 2021/23382
USPC .............................................. 280/739, 743.1
See application file for complete search history.

(56) References Cited

U.S. PATENT DOCUMENTS

| | | | | |
|---|---|---|---|---|
| 7,726,685 B2 * | 6/2010 | Abe et al. | ....................... | 280/736 |
| 7,857,347 B2 * | 12/2010 | Abe et al. | ................... | 280/743.2 |
| 7,883,110 B2 * | 2/2011 | Pausch | ........................... | 280/739 |
| 7,922,197 B2 * | 4/2011 | Fukawatase et al. | ......... | 280/739 |
| 7,931,297 B2 * | 4/2011 | Abe et al. | ....................... | 280/739 |
| 8,020,891 B2 * | 9/2011 | Fukawatase et al. | ......... | 280/739 |
| 8,070,183 B2 * | 12/2011 | Kumagai et al. | ........... | 280/743.2 |
| 8,419,054 B2 * | 4/2013 | Abe | .............................. | 280/739 |

(Continued)

FOREIGN PATENT DOCUMENTS

| | | |
|---|---|---|
| JP | 2004-262432 A | 9/2004 |
| JP | 2008-189024 A | 8/2008 |

(Continued)

*Primary Examiner* — Paul N Dickson
*Assistant Examiner* — Robert A Coker
(74) *Attorney, Agent, or Firm* — Edwards Wildman Palmer LLP; Peter F. Corless

(57) ABSTRACT

Disclosed is an airbag apparatus for vehicles including a vent hole in an airbag cushion for discharging inflating gas. A cover is provided on an outer surface of the airbag cushion and is adjustable between a state where the cover is spaced apart from the vent hole to open it and a state where the cover comes into close contact with the vent hole to close it. A tether is connected at its first end to the cover and secured at its second end to an interior of the airbag cushion to impart a tensile force to the cover. A tether guide is provided on an inner surface of the airbag cushion to support the tether, and a sealing means is provided between the vent hole and the tether guide to support the tether, the tether passing through the sealing means.

15 Claims, 8 Drawing Sheets

(56) References Cited

U.S. PATENT DOCUMENTS

| | | |
|---|---|---|
| 2006/0151979 A1 | 7/2006 | DePottey et al. |
| 2007/0045997 A1* | 3/2007 | Abe et al. .................. 280/729 |
| 2010/0001498 A1* | 1/2010 | Abe et al. .................. 280/739 |
| 2010/0133798 A1* | 6/2010 | Fukawatase et al. ...... 280/743.2 |
| 2011/0309605 A1* | 12/2011 | Kumagai .................. 280/741 |
| 2012/0074677 A1* | 3/2012 | Hiruta et al. .............. 280/739 |

FOREIGN PATENT DOCUMENTS

| | | |
|---|---|---|
| JP | 2010-036770 A | 2/2010 |
| JP | 2012-171408 A | 9/2012 |
| KR | 10-2005-0076044 | 7/2005 |
| KR | 10-2006-0130944 A | 12/2006 |
| KR | 10-2008-0073787 A | 8/2008 |

* cited by examiner

AIRBAG APPARATUS FOR VEHICLE

CROSS-REFERENCE TO RELATED APPLICATIONS

This application claims priority under 35 U.S.C. §119 to Korean Patent Application No. 10-2012-0152949, filed on Dec. 26, 2012, in the Korean Intellectual Property Office, the disclosure of which is incorporated herein by reference in its entirety.

BACKGROUND OF THE INVENTION

1. Field of the Invention

The present invention relates to an airbag apparatus for a vehicle and, more particularly, to a vent structure configured for properly discharging inflating gas for an airbag cushion.

2. Description of the Related Art

An airbag protects a passenger from impact in the event of a vehicle accident by properly inflating an airbag cushion, thus reducing or preventing an injury. The inflating behavior of the airbag cushion plays a very important role in securing the safety of a passenger.

Particularly, the required inflating behavior of the airbag cushion should be such that the cushion inflates to provides rapid restraint of a passenger in an initial deploying stage. Subsequently, when the passenger comes into contact with the airbag cushion and a load is applied, inflating gas is properly discharged from the airbag cushion, thus allowing the passenger to be properly protected from impact.

Further, an airbag apparatus must meet requirements provided in various regulations, such as the North American Low Risk Deployment (LRD) regulation. According to the LRD regulation, inflating gas is required to be discharged through a vent hole, so as to minimize an injury to a child or a passenger near the airbag apparatus, even in the initial deploying stage of the airbag cushion. Hereinafter, performance for satisfying this LRD regulation will be referred to as "LRD performance".

In order to satisfy the above-mentioned LRD performance, the vent hole of the airbag cushion should be open to emit some of the inflating gas, even in the initial deploying stage of the airbag cushion. However, in order to rapidly inflate the airbag cushion as described above, the vent hole should be closed in the initial deploying stage of the airbag cushion. Then, if the airbag cushion is fully inflated and a passenger starts to come into contact with the airbag cushion, the vent hole should be open to discharge inflating gas. As such, this is problematic in that, depending on the deploying process of the airbag cushion and the sitting condition of a passenger, it is not easy to properly open and close the vent hole at a proper time.

Korean Patent Laid-Open Publication No. 10-2005-00760440 is entitled "Airbag Cushion Having Variable Vent".

However, this configuration is still problematic in that, depending on the deploying process of the airbag cushion and the sitting condition of a passenger, it is not easy to properly open or close the vent hole at a proper time.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art.

According to one aspect, the present invention provides an airbag apparatus for a vehicle, which is configured to perform rapid deployment of an airbag cushion in an initial deploying stage, to properly protect a passenger from impact when the passenger comes into contact with the airbag cushion, and to satisfy LRD performance for reducing an injury to a child or a passenger near to airbag apparatus.

According to another aspect, the present invention provides an airbag apparatus for a vehicle, which prevents a loss of gas in an airbag cushion in an initial deploying stage, thus increasing an initial restraining force for a passenger.

According to a further aspect, the present invention provides an airbag apparatus for a vehicle, which controls an amount of gas emitted from an airbag cushion in an initial deploying stage of the airbag cushion.

In order to accomplish the above objects, the present invention provides an airbag apparatus for a vehicle, including a vent hole formed in an airbag cushion to discharge inflating gas therefrom; a cover provided on an outer surface of the airbag cushion, the cover being adjustable between a state in which the cover is spaced apart from the vent hole to open the vent hole by an imparted tensile force, and a state in which the cover comes into close contact with the vent hole to close the vent hole; a tether connected at a first end thereof to the cover and secured at a second end thereof to an interior of the airbag cushion to impart a tensile force to the cover through the vent hole; a tether guide provided on an inner surface of the airbag cushion to support the tether, the tether passing through the tether guide while being slidable on the inner surface of the airbag cushion; and a sealing means provided between the vent hole and the tether guide to support the tether, the tether passing through the sealing means after passing through the tether guide.

According to various embodiments, the vent hole is formed in a side surface of the airbag cushion. Further, the tether may be secured at the second end thereof to a front of the airbag cushion, and the tether guide may be provided on an inner surface of a portion of the airbag cushion with which a passenger's head may come into contact with during deployment.

According to various embodiments, a portion of the cover is attached to the airbag cushion to surround the vent hole and a remaining portion thereof is open, thus defining a pocket-shaped outlet together with the outer surface of the airbag cushion to discharge inflating gas escaping from the vent hole to an atmosphere.

According to various embodiments, the cover is shaped into a trapezoid having triangles connected to both sides of a tetragon. In particular, the triangles on the both sides of the tetragon can define a space that causes the tetragon to be spaced apart from a surface of the airbag cushion. Further, oblique sides of the triangles may be tapered, respectively, towards the tetragon. A side of the tetragon connecting the oblique sides to each other may be directly attached to the airbag cushion while surrounding the vent hole. Further, remaining sides of the triangles and the tetragon may be free and open (i.e. exposed) while being spaced apart from the airbag cushion.

According to various embodiments, the first end of the tether is connected to the inner surface of the cover.

According to various embodiments, the sealing means is provided at a position adjacent to the vent hole.

According to various embodiments, the sealing means includes a vent guide on the inner surface of the airbag cushion to support the tether. Further, and the tether may pass through the vent guide while being slidable along the inner surface of the airbag cushion.

According to various embodiments, the sealing means has a tether hole to allow the tether to pass through the airbag cushion. Further, the first end of the tether may pass through the tether hole and may be connected to the cover.

According to various embodiments, the tether supported on the tether guide is attached, for example, by sewing, to at least one of the tether guide and the airbag cushion to form a temporary seaming line. Further, the temporary seaming line may be torn off in an initial deploying stage of the airbag cushion.

According to various embodiments, the tether supported on the vent guide is attached, for example, by sewing, to at least one of the vent guide and the airbag cushion to form a temporary seaming line, Further, the temporary seaming line may be torn off in an initial deploying stage of the airbag cushion.

According to various embodiments, by adjusting a length of the tether connected between the temporary seaming line and the cover to fold the airbag cushion without changing an attachment (e.g. sewing) position of the temporary seaming line, an opening ratio of the cover that closes the vent hole is adjusted in the initial deploying stage of the airbag cushion. In particular, the opening ratio may be adjusted depending on the length of the tether connected between the temporary seaming line and the cover.

According to various embodiments, the length of the tether between the temporary seaming line and the cover is set to a length in which the cover covers the vent hole to close the vent hole in the initial deploying stage of the airbag cushion.

According to various embodiments, the length of the tether between the temporary seaming line and the cover is set to a length in which the cover is spaced apart from the vent hole to open the vent hole, in the initial deploying stage of the airbag cushion.

Other features and aspects of the present invention will be apparent from the following detailed description, drawings and claims.

BRIEF DESCRIPTION OF THE DRAWINGS

The above and other objects, features and advantages of the present invention will be more clearly understood from the following detailed description taken in conjunction with the accompanying drawings, in which.

Figure 1:
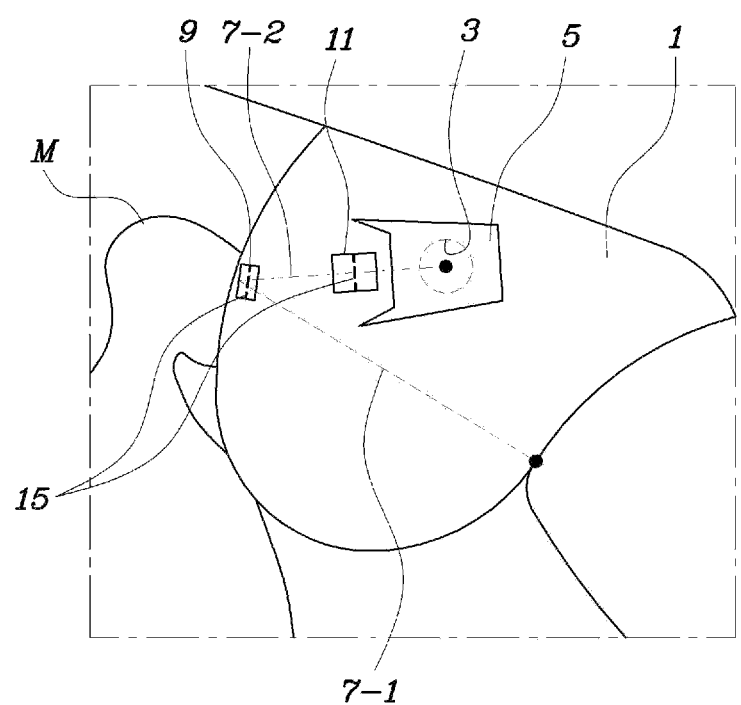
FIG. 1 is a view showing a closing structure of a vent hole using a tether and a structure of a sealing means in an initial deploying stage of an airbag apparatus, according to an embodiment of the present invention.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment. The specific solar cell type of the invention as disclosed herein will be determined in part by the particular intended application and use environment.

In the figures, reference numerals refer to the same or equivalent parts of the disclosure throughout the several figures of the drawings.

DESCRIPTION OF PREFERRED EMBODIMENTS

Hereinafter, the preferred embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 2:
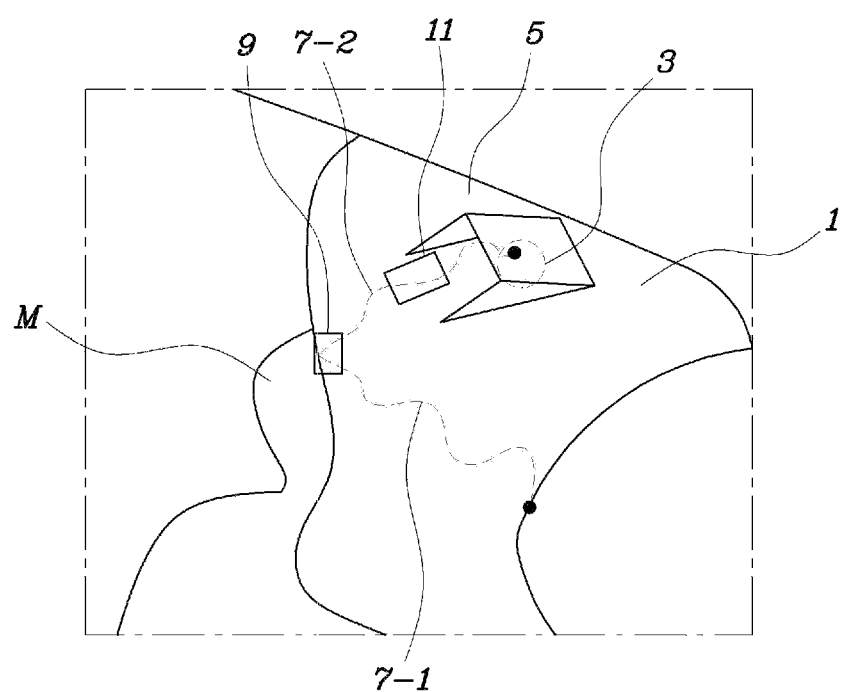
FIG. 2 is a view showing an opening structure of the vent hole when supporting a passenger by an airbag cushion of FIG. 1.
Figure 3:
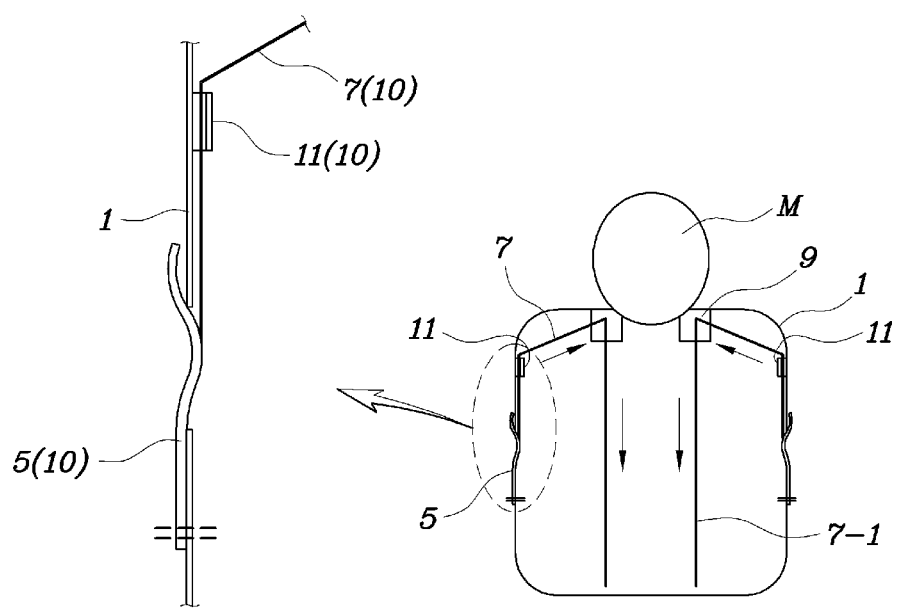
FIG. 3 is a view of the airbag cushion of FIG. 1 seen from above.
Figure 4:
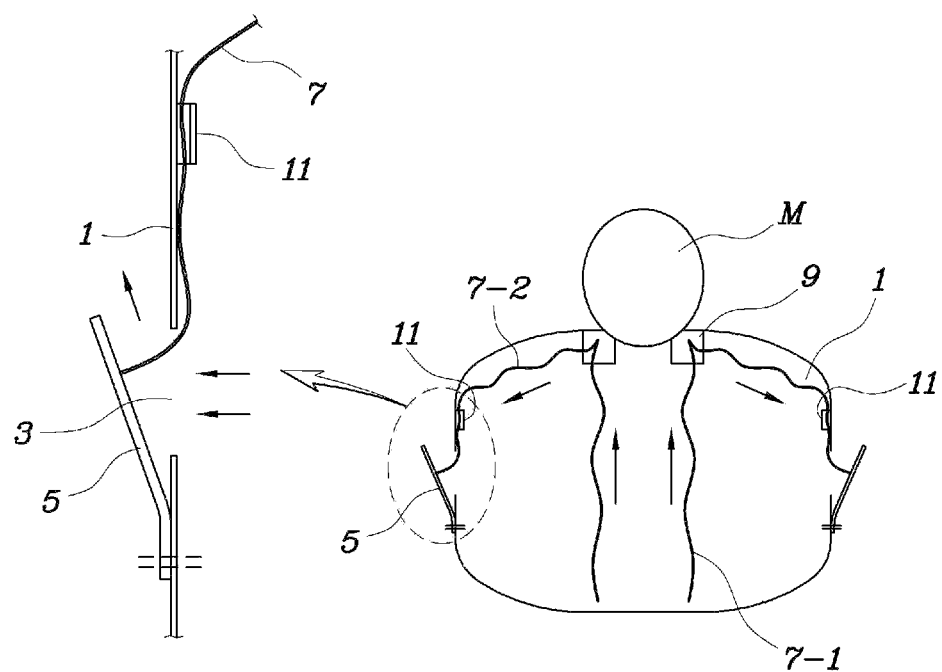
FIG. 4 is a view of the airbag cushion of FIG. 2 seen from above.

FIG. 1 is a view showing a closing structure of a vent hole 3 using a tether 7 and a structure of a sealing means in an initial deploying stage of an airbag apparatus according to an embodiment of the present invention. FIG. 2 is a view showing an opening structure of the vent hole 3 when the airbag cushion 1 of FIG. 1 supports a passenger. FIG. 3 is a view of the airbag cushion 1 of FIG. 1 seen from above, and FIG. 4 is a view of the airbag cushion 1 of FIG. 2 seen from above.

Figure 5:
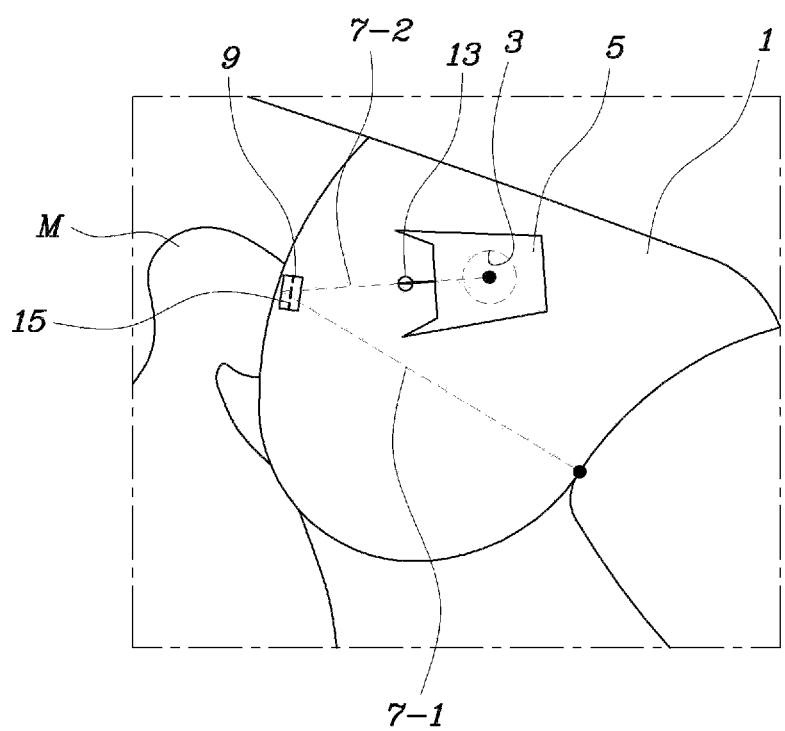
FIG. 5 is a view showing a closing structure of a vent hole using a tether and a structure of a sealing means in an initial deploying stage of an airbag apparatus, according to another embodiment of the present invention.
Figure 6:
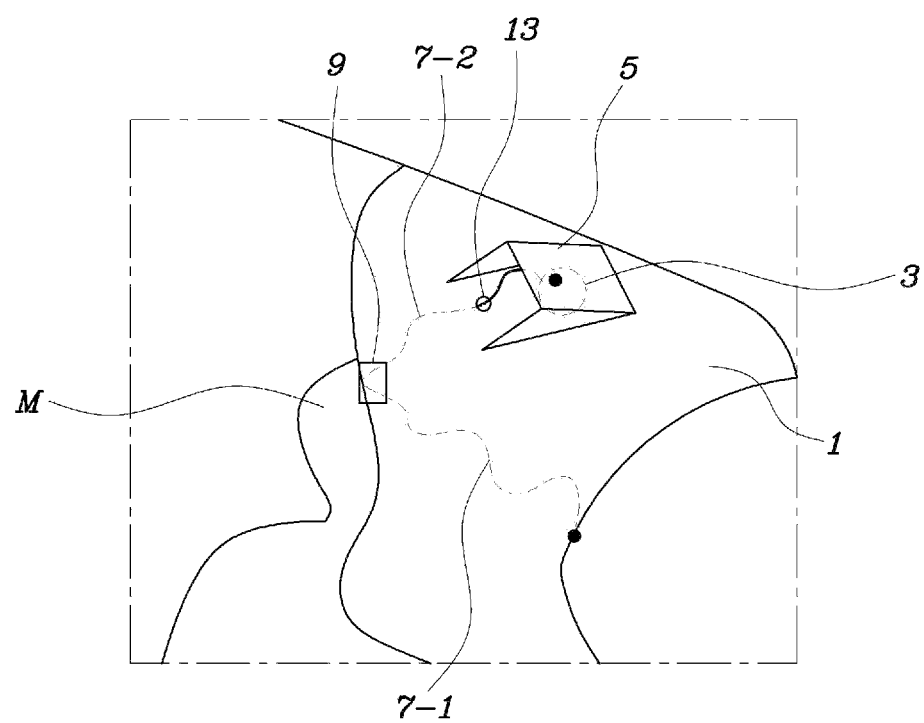
FIG. 6 is a view showing an opening structure of the vent hole when supporting a passenger by an airbag cushion of FIG. 5.
Figure 7:
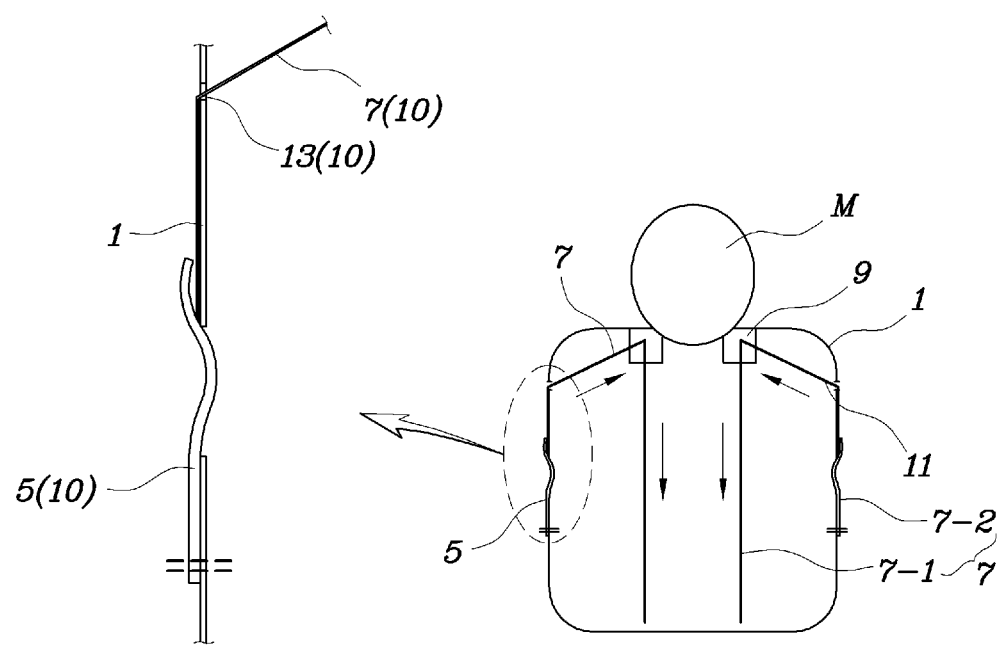
FIG. 7 is a view of the airbag cushion of FIG. 5 seen from above.
Figure 8:
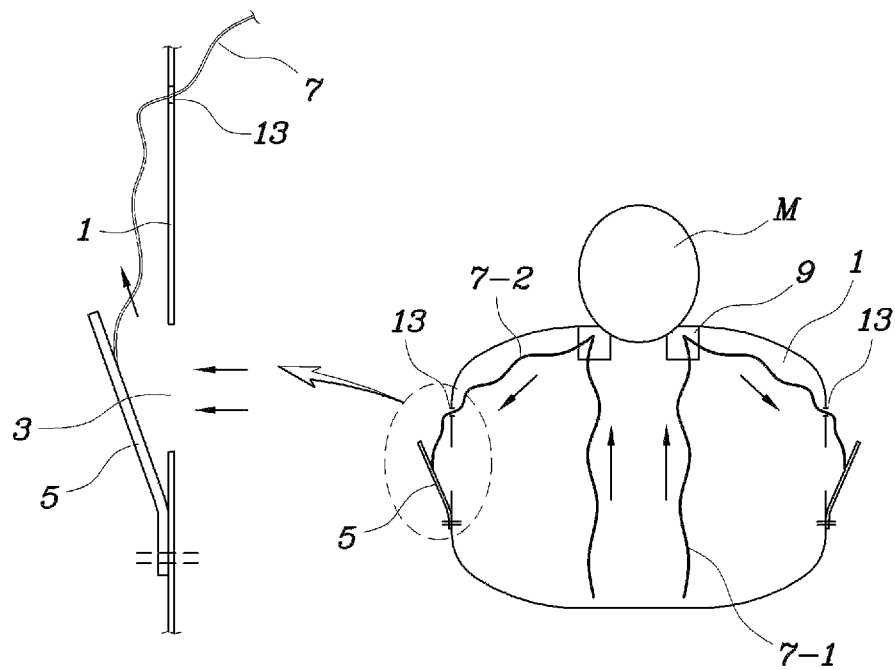
FIG. 8 is a view of the airbag cushion of FIG. 6 seen from above.

Further, FIG. 5 is a view showing a closing structure of a vent hole 3 using a tether 7 and a structure of a sealing means in an initial deploying stage of an airbag apparatus according to another embodiment of the present invention. FIG. 6 is a view showing an opening structure of the vent hole 3 when an airbag cushion 1 of FIG. 5 supports a passenger. FIG. 7 is a view of the airbag cushion 1 of FIG. 5 seen from above, and FIG. 8 is a view of the airbag cushion 1 of FIG. 6 seen from above.

Referring to the drawings, the airbag apparatus for the vehicle according to embodiments of the present invention mainly includes a vent hole 3, a cover 5, a tether 7, a tether guide 9 and a sealing means.

The configuration of the airbag apparatus according to a first embodiment of the present invention will be described in detail with reference to FIGS. 1 to 4. The airbag apparatus includes a vent hole 3 that is formed in an airbag cushion 1 to discharge inflating gas therefrom. A cover 5 is provided on an outer surface of the airbag cushion 1, and is adjustable between a state in which the cover 5 is spaced apart from the vent hole 3 to thereby open the vent hole 3 by an imparted tensile force, and a state in which the cover 5 comes into close contact with the vent hole 3 to thereby close the vent hole 3. A tether 7 is connected at a first end to the cover 5, and is secured at a second end to an interior of the airbag cushion 1. The tether 7, thus, imparts a tensile force to the cover 5 through the vent hole 3. A tether guide 9 is further provided on an inner surface of the airbag cushion 1 to support the tether 7, such that the tether 7 passes through the tether guide 9 while being slidable on the inner surface of the airbag cushion 1. A sealing means is further provided between the vent hole 3 and the tether guide 9 to support the tether 7. In particular, the tether 7 passes through the sealing means after passing through the tether guide 9.

The vent hole 3 is formed in a side surface of the airbag cushion 1. A second end of the tether 7 is secured to a front of the airbag cushion 1. Further, the tether guide 9 is provided on an inner surface of the airbag cushion 1 at a location with which a passenger's head M contacts when the airbag cushion is deployed.

As shown, central portion of the tether guide 9 surrounds the tether 7 together with the inner surface of the airbag cushion 1. Further, both sides of the tether guide 9 are attached, such as by sewing, to the airbag cushion 1.

As shown in FIGS. 1 to 8, a portion of the cover 5 is attached to the airbag cushion 1 to surround the vent hole 3, and a remaining portion thereof is open (i.e. not attached to the airbag cushion 1), thus defining a pocket-shaped outlet or opening together with the outer surface of the airbag cushion 1. As such, to the cover 5 discharges inflating gas escaping from the vent hole 3 to the atmosphere when the cover is open 5.

As shown, the cover 5 is shaped into a trapezoid having triangles connected to both sides of a tetragon, the triangles on the both sides of the tetragon defining a space to cause the tetragon to be spaced apart from a surface of the airbag cushion 1. Oblique sides of the triangles are tapered, respectively, towards the tetragon, and a side of the tetragon connecting the oblique sides to each other are directly attached to the airbag cushion 1 while surrounding the vent hole 3. Further, remaining sides of the triangles and the tetragon are free and open (i.e. not attached to the airbag cushion 1), thus being spaced apart from the airbag cushion 1.

Of course, the cover 1 is not limited to this specific geometrical configuration, and various other geometrical shapes may be provided for the cover 1 that provide the same general structure in which a pocket-shaped outlet or opening is formed with the surface of the airbag cushion 1.

As shown in FIGS. 3 and 7, the tether 7 may be divided into a first tether portion 7-1 and a second tether portion 7-2. The first tether portion 7-1 can connect front and rear portions of the airbag cushion 1 to each other based on the tether guide 9. The second tether portion 7-2 can extend to a side of the airbag cushion 1 and can connect to the cover 5. Thus, the opening and closing operation of the cover 5 can be carried out by pressure of inflating gas in the airbag cushion 1, and a change in relative length between the first tether portion 7-1 and the second tether portion 7-2 of the tether 7.

Further, the sealing means is preferably provided on a side portion of the airbag cushion 1 in such a way as to be positioned between the vent hole 3 and the tether guide 9. Such a sealing means supports the tether 7, which passes through the tether guide 9. The tether 7 can, thus, pass through the sealing means to be connected to the cover 5.

Here, the first end of the tether 7 may be connected to the inner surface of the cover 5.

In addition, the sealing means may be located adjacent to the vent hole 3.

The configuration of an embodiment of the sealing means will be described with reference to FIGS. 1 to 4. As shown, a vent guide 11 is provided on an inner surface of the airbag cushion 1 and is configured so as to support the tether 7. In particular, the tether 7 passes through the vent guide 11 while being slidable along the inner surface of the airbag cushion 1. Thereby, the first end of the tether 7 may be connected to the cover 5.

FIGS. 5 to 8 show the configuration of another embodiment of the sealing means. As shown, a tether hole 13 is formed to allow the tether 7 to pass through the airbag cushion 1 between an outer and inner surface of the airbag cushion 1. The first end of the tether 7 may, thus, pass through the tether hole 13 and may be connected to the cover 5.

The airbag apparatus configured as described above in either embodiment can be operated as follows. In the initial deploying stage of the airbag cushion 1, as shown in FIG. 3, a rear portion of the airbag cushion 1 to which the tether guide is mounted moves in a backwards direction towards the passenger's head M. In this case, by the relative movement of the tether guide 9, the second tether portion 7-2 of the tether 7 is pulled as shown by the arrow to move to the first tether portion 7-1. Consequently, the cover 5 closes the vent hole 3, thus allowing the airbag cushion 1 to be rapidly deployed in the initial stage.

Particularly, the second tether portion 7-2 is slidably pulled along the side surface of the airbag cushion 1 while being supported at a position adjacent to the vent hole 3 by the vent guide 11 or the tether hole 13, thus sealing the vent hole 3. Therefore, a loss of inflating gas escaping through the vent hole 3 is minimized, so that the initial deploying performance of the airbag cushion 1 is improved.

FIG. 4 illustrates a state in which the passenger's head M comes into contact with the airbag cushion 1 after the airbag cushion 1 is deployed. As the passenger's head M pushes the rear portion of the airbag cushion 1 forwards, the tether guide 9 moves forwards, and the inflating gas generates a force to push the cover 5 outwards. As a result, the first tether portion 7-1 of the tether 7 is pulled and moved towards the second tether portion 7-2. Consequently, the second tether portion 7-2 of the tether 7 lengthens, and the cover 5 opens the vent hole 3. The inflating gas is then discharged from the airbag cushion 1 through the opened vent hole 3, thus lessening impact transmitted from the airbag cushion 1 to a passenger.

Through such an operation, the cover 5 closes the vent hole 3 to allow the airbag cushion 1 to be rapidly deployed in the initial deploying stage of the airbag cushion 1. Further, when a passenger comes into contact with the airbag cushion 1, the cover 5 opens the vent hole 3 to properly protect a passenger from excessive impact.

Figure 9:
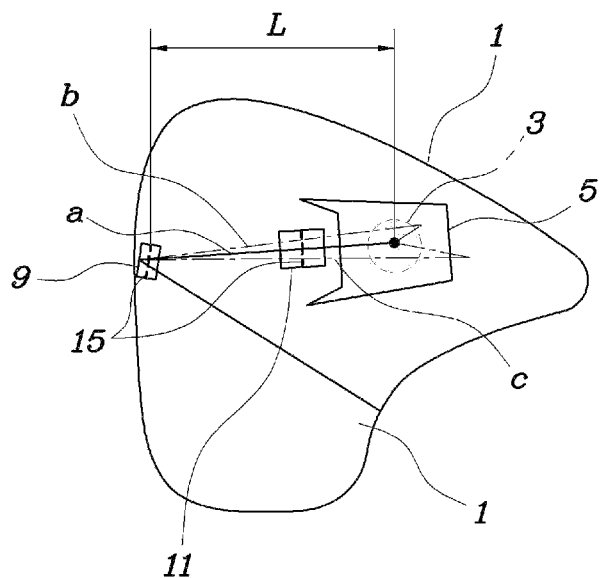
FIG. 9 is a view showing a tether provided between a temporary seaming portion and a vent hole of the present invention, according to the length.

FIG. 9 is a view showing the tether 7 provided between a temporary seaming portion and the vent hole 3 of the present invention, according to the length therebetween.

Referring to FIG. 9, the tether 7 which is supported by the tether guide 9 is attached (e.g. by sewing) to at least one of the tether guide 9 and the airbag cushion 1 to form a temporary seaming line 15. This temporary seaming line 15 may be torn off in the initial deploying stage of the airbag cushion 1.

In other words, at a position of the tether guide 9, the tether 7 may be attached (e.g. sewn) to either or both of the tether guide 9 and the airbag cushion 1 to form the temporary seaming line 15.

Further, the tether 7 which is supported on the vent guide 11 is attached (e.g. sewn) to at least one of the vent guide 11 and the airbag cushion 1 to form a temporary seaming line 15. This temporary seaming line 15 is torn off in the initial deploying stage of the airbag cushion 1.

In other words, at a position of the vent guide 11, the tether 7 may be attached (e.g. sewn) to either or both the vent guide 11 and the airbag cushion 1 to form the temporary seaming line 15.

Accordingly, when the airbag cushion 1 is folded, the position of the tether 7 can be regulated so that tethers 7 on both sides of the airbag cushion 1 are symmetrical with respect to each other. When the airbag cushion 1 is deployed, the covers 5 on both sides thereof are open and an opening ratio of each cover 5 can be controlled so as to preventing the airbag cushion 1 from being eccentrically deployed and to further enhancing the deploying performance of the airbag cushion 1.

Moreover, a length L of the tether 7 connected between the temporary seaming line 15 and the cover 5 may be adjusted to fold the airbag cushion 1, without changing the attachment (e.g. sewing) position of the temporary seaming line 15. Thus, depending on the length L of the tether 7 connected between the temporary seaming line 15 and the cover 5, it is possible to control the opening ratio at which the cover 5 covers the vent hole 3, particularly in the initial deploying stage of the airbag cushion 1.

In particular, a, b and c of FIG. 9 show tethers 7 provided between the temporary seaming portion and the vent hole 3, according to the length L. As for the tether 7 shown by a in FIG. 9, the length L of the tether 7 provided between the temporary seaming line 15 and the cover 5 may be set to a length in which the cover 5 covers the vent hole 3 to close the vent hole 3, in the initial deploying stage of the airbag cushion 1.

Thus, in the state where the length L of the tether 7 is adjusted to a position in which the cover 5 of the vent hole 3 is closed in the initial deploying stage of the airbag cushion 1, it is possible to form (e.g. by sewing) the temporary seaming line 15. Thereby, in the initial deploying stage of the airbag cushion 1, a loss of the inflating gas escaping through the vent hole 3 can be minimized, so that the speed and performance of deploying the airbag cushion 1 in the initial stage are improved.

As for the tethers 7 shown by b and c in FIG. 9, the length L of the tether 7 between the temporary seaming line 15 and the cover 5 may be further set to a length in which the cover 5 moves away from the vent hole 3 to open the vent hole 3, in the initial deploying stage of the airbag cushion 1.

In particular, in the state in which the length L of the tether 7 is adjusted to a position where the cover 5 of the vent hole 3 is opened in the initial deploying stage of the airbag cushion 1, it is possible to form (e.g. by sewing) the temporary seaming line 15. Therefore, in the initial deploying stage of the airbag cushion 1, inflating gas is allowed to escape through the vent hole 3, thus delaying a time when the vent hole 3 is closed, and thereby improving the LRD performance of the airbag cushion 1.

Meanwhile, according to the present invention, even if a passenger is a child, when his or her head M comes into contact with the airbag cushion 1 in the initial deploying stage of the airbag cushion 1, a portion equipped with the tether guide 9 moves to the front of the airbag cushion 1, and simultaneously the first tether portion 7-1 of the tether 7 moves to the second tether portion 7-2. As a result, when a sufficient length of the second tether portion 7-2 is attained, the cover 5 is opened by the inflating gas of the airbag cushion 1, so that the inflating gas is released. Consequently, the airbag apparatus can present a proper LRD performance, thus more effectively protecting a passenger such as a child.

Further, the airbag apparatus of the present invention constructed as described above can provide an effective shock absorbing action, both in the case of an accident when a passenger wears a safety belt and in the case of an accident when a passenger does not wear the safety belt.

In other words, when an accident occurs in the state in which a passenger wears the safety belt, a portion of the airbag cushion 1 that is first in contact with the passenger is the portion equipped with the tether guide 9. Thus, the cover 5 is opened by a relatively rapid operation, so that the airbag cushion 1 becomes relatively soft. As a result, the passenger primarily protected by the safety belt can be additionally be effectively protected by the airbag cushion 1.

On the other hand, when an accident occurs in the state in which a passenger does not wear the safety belt, a portion of the airbag cushion 1 that first comes into contact with the passenger deviates from the portion equipped with the tether guide 9. Thus, the cover 5 is opened later by a relatively slow operation, so that the airbag cushion 1 is relatively hard and relatively strongly supports and protects the passenger who is not also protected by the safety belt. As a result, the airbag apparatus of the present invention can provide shock absorbing performance suitable for an associated situation depending on whether or not a passenger wears the safety belt.

As described above, the present invention provides an airbag apparatus which has a structure of an integrated vent hole, thus allowing an airbag cushion to be rapidly deployed in an initial deploying stage, and so as to properly protect a passenger from impact upon coming into contact with the airbag cushion. The airbag apparatus further has a sealing means to allow a tether to pull a cover and close the vent hole at a position near the vent hole, thus minimizing a loss of inflating gas that may escape through the vent hole, and thereby improving an initial deploying performance of the airbag cushion.

Further, the present invention provides an airbag apparatus which adjusts a tether length between a vent hole and a temporary seaming line by using the temporary seaming line along which a tether is attached (e.g. sewn) to an airbag cushion. As such, the opening time and opening ratio of covers provided on both sides of the airbag apparatus can be controlled, and uneven deployment of the airbag cushion can be prevented. Further, the deploying performance of the airbag cushion can be improved, and a discharging amount of inflating gas through the vent hole can be adjusted to thereby secure LRD performance suitable for an associated situation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag apparatus for a vehicle, comprising:
an airbag cushion;
a vent hole formed in the airbag cushion to discharge inflating gas therefrom;
a cover provided on an outer surface of the airbag cushion, the cover being adjustable between a state in which the cover is spaced apart from the vent hole to open the vent hole by an imparted tensile force, and a state in which the cover comes into close contact with the vent hole to close the vent hole;
a tether connected at a first end to the cover and secured at a second end to an interior of the airbag cushion to impart a tensile force to the cover through the vent hole;
a tether guide provided on an inner surface of the airbag cushion to support the tether, the tether passing through the tether guide and being slidable along the inner surface of the airbag cushion; and
sealing means provided between the vent hole and the tether guide to support the tether, the tether passing through the sealing means after passing through the tether guide,
wherein the tether supported on the tether guide is sewn to at least one of the tether guide and the airbag cushion to form a temporary seaming line, the sewn temporary seaming line being torn off in an initial deploying stage of the airbag cushion.

2. The airbag apparatus as set forth in claim 1, wherein
the vent hole is formed in a side surface of the airbag cushion,
the tether is secured at the second end thereof to a front of the airbag cushion, and
the tether guide is provided on an inner surface of a portion of the airbag cushion with which a passenger's head contacts during deployment of the airbag cushion.

3. The airbag apparatus as set forth in claim 1, wherein a portion of the cover is attached to the airbag cushion to surround the vent hole and a remaining portion thereof is open, thus defining a pocket-shaped opening together with the outer surface of the airbag cushion, wherein inflating gas escaping from the vent hole is discharged through the pocket-shaped opening to an atmosphere.

4. The airbag apparatus as set forth in claim 3, wherein the cover is trapezoidal in shape and comprises triangles connected to both sides of a tetragon to form a trapezoid, and the triangles on the both sides of the tetragon are configured to space the tetragon apart from a surface of the airbag cushion,
sides of the triangles are tapered, respectively, towards the tetragon, and one side of the tetragon connects the sides of the triangles to each other which are directly attached to the airbag cushion while surrounding the vent hole, and remaining sides of the triangles and the tetragon being unattached and open while being spaced apart from the airbag cushion.

5. The airbag apparatus as set forth in claim 1, wherein the first end of the tether is connected to an inner surface of the cover.

6. The airbag apparatus as set forth in claim 1, wherein the sealing means is provided at a position adjacent to the vent hole.

7. The airbag apparatus as set forth in claim 6, wherein the sealing means comprises a vent guide on the inner surface of the airbag cushion to support the tether, and the tether passes through the vent guide while being slidable along the inner surface of the airbag cushion, the first end of the tether passing through the vent guide being connected to the cover.

8. The airbag apparatus as set forth in claim 7, wherein the tether supported on the vent guide is sewn to at least one of the vent guide and the airbag cushion to form a temporary seaming line, the sewn temporary seaming line being torn off in an initial deploying stage of the airbag cushion.

9. The airbag apparatus as set forth in claim 8, wherein, by adjusting a length of the tether connected between the temporary seaming line and the cover without changing a sewing position of the temporary seaming line, an opening ratio of the cover closing the vent hole is adjusted in the initial deploying stage of the airbag cushion, depending on the length of the tether connected between the temporary seaming line and the cover.

10. The airbag apparatus as set forth in claim 9, wherein the length of the tether between the temporary seaming line and the cover is set to a length in which the cover covers the vent hole to close the vent hole, in the initial deploying stage of the airbag cushion.

11. The airbag apparatus as set forth in claim 9, wherein the length of the tether between the temporary seaming line and the cover is set to a length in which the cover is spaced apart from the vent hole to open the vent hole, in the initial deploying stage of the airbag cushion.

12. The airbag apparatus as set forth in claim 6, wherein the sealing means has a tether hole through which the tether passes through the airbag cushion, the first end of the tether passing through the tether hole being connected to the cover.

13. The airbag apparatus as set forth in claim 1, wherein, by adjusting a length of the tether connected between the temporary seaming line and the cover without changing a sewing position of the temporary seaming line, an opening ratio of the cover closing the vent hole is adjusted in the initial deploying stage of the airbag cushion, depending on the length of the tether connected between the temporary seaming line and the cover.

14. The airbag apparatus as set forth in claim 13, wherein the length of the tether between the temporary seaming line and the cover is set to a length in which the cover covers the vent hole to close the vent hole, in the initial deploying stage of the airbag cushion.

15. The airbag apparatus as set forth in claim 13, wherein the length of the tether between the temporary seaming line and the cover is set to a length in which the cover is spaced apart from the vent hole to open the vent hole, in the initial deploying stage of the airbag cushion.

* * * * *